United States Patent
Huang et al.

(10) Patent No.: US 11,196,741 B2
(45) Date of Patent: Dec. 7, 2021

(54) METHOD AND APPARATUS FOR ESTABLISHING TRUSTED COMPUTING CLUSTER

(71) Applicant: Advanced New Technologies Co., Ltd., Grand Cayman (KY)

(72) Inventors: Qunshan Huang, Zhejiang (CN); Xingyu Chen, Zhejiang (CN); Ling Xie, Zhejiang (CN); Lei Wang, Zhejiang (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 17/161,359

(22) Filed: Jan. 28, 2021

(65) Prior Publication Data
US 2021/0185038 A1 Jun. 17, 2021

Related U.S. Application Data

(63) Continuation of application No. PCT/CN2019/116252, filed on Nov. 7, 2019.

(30) Foreign Application Priority Data

Dec. 29, 2018 (CN) .......................... 201811631728.9

(51) Int. Cl.
*H04L 29/06* (2006.01)
*H04L 9/08* (2006.01)

(52) U.S. Cl.
CPC .......... *H04L 63/0869* (2013.01); *H04L 9/085* (2013.01)

(58) Field of Classification Search
CPC ... H04L 63/0869; H04L 9/085; H04L 63/104; H04L 63/065; H04L 67/20
See application file for complete search history.

(56) References Cited

U.S. PATENT DOCUMENTS 8,176,336 B1 * 5/2012 Mao ........................ G06F 21/57
 713/189
8,954,740 B1 * 2/2015 Moscaritolo .............. H04L 9/14
 713/171
(Continued)

FOREIGN PATENT DOCUMENTS

CN 1415158 A 4/2003
CN 1564514 A 1/2005
(Continued)

OTHER PUBLICATIONS

3GPP Technical Specification Group Services and System Aspects. 3GPP System Architecture Evolution (SAE), Security Architecture (Release 12), GPP TS 133.401, V12.16.0, 2015.

*Primary Examiner* — J. Brant Murphy
(74) *Attorney, Agent, or Firm* — Seed IP Law Group LLP

(57) ABSTRACT

The implementations provide a method and an apparatus for establishing a trusted cluster. The method is used to form a trusted computing cluster by using N trusted computing units, the method including: grouping the N trusted computing units into a plurality of groups; identifying a first trusted computing unit in each group, and causing first trusted computing units in the plurality of groups to each respectively perform inter-unit trust authentication with other trusted computing units in a same group in parallel; performing inter-group trust authentication between/among the plurality of groups in parallel to obtain the N trusted computing units on which trust authentication succeeds; and propagating secret information in the N trusted computing units on which trust authentication succeeds, so that the N trusted computing units obtain the same secret information to form the trusted computing cluster.

20 Claims, 13 Drawing Sheets

(56) References Cited

U.S. PATENT DOCUMENTS

| | | | | |
|---|---|---|---|---|
| 2003/0044020 | A1* | 3/2003 | Aboba | H04L 63/04 380/278 |
| 2004/0210767 | A1* | 10/2004 | Sinclair | H04L 63/0869 726/6 |
| 2005/0223217 | A1* | 10/2005 | Howard | H04L 63/0884 713/155 |
| 2007/0003064 | A1* | 1/2007 | Wiseman | H04L 9/0825 380/281 |
| 2007/0076889 | A1* | 4/2007 | DeRobertis | H04L 9/0825 380/279 |
| 2007/0297613 | A1 | 12/2007 | Ghosh | |
| 2008/0159541 | A1* | 7/2008 | Kumar | G06F 21/57 380/278 |
| 2010/0162036 | A1* | 6/2010 | Linden | G06F 11/181 714/4.11 |
| 2010/0332829 | A1* | 12/2010 | Baroffio | H04N 21/25816 713/168 |
| 2012/0189117 | A1* | 7/2012 | Devanand | H04L 9/3236 380/28 |
| 2013/0002968 | A1* | 1/2013 | Bridge | H04N 19/97 348/744 |
| 2015/0195261 | A1* | 7/2015 | Gehrmann | H04L 9/0833 726/7 |
| 2017/0083716 | A1* | 3/2017 | Sun | H04L 9/14 |
| 2020/0067912 | A1* | 2/2020 | Block | H04L 9/3263 |

FOREIGN PATENT DOCUMENTS

| | | |
|---|---|---|
| CN | 101170404 A | 4/2008 |
| CN | 101594386 A | 12/2009 |
| CN | 101651543 A | 2/2010 |
| CN | 102244577 A | 11/2011 |
| CN | 102986163 A | 3/2013 |
| CN | 103051455 A | 4/2013 |
| CN | 103828289 A | 5/2014 |
| CN | 103856477 A | 6/2014 |
| CN | 103959735 A | 7/2014 |
| CN | 105790938 A | 7/2016 |
| CN | 105915502 A | 8/2016 |
| CN | 106101252 A | 11/2016 |
| CN | 106332074 A | 1/2017 |
| CN | 106991329 A | 7/2017 |
| CN | 206611427 U | 11/2017 |
| CN | 107924445 A | 4/2018 |
| CN | 108259469 A | 7/2018 |
| CN | 108491727 A | 9/2018 |
| CN | 108833522 A | 11/2018 |
| CN | 108847928 A | 11/2018 |
| CN | 109861980 A | 6/2019 |
| CN | 109873801 A | 6/2019 |
| WO | WO 2012159272 A1 | 11/2012 |
| WO | WO 2013046088 A1 | 4/2013 |

* cited by examiner

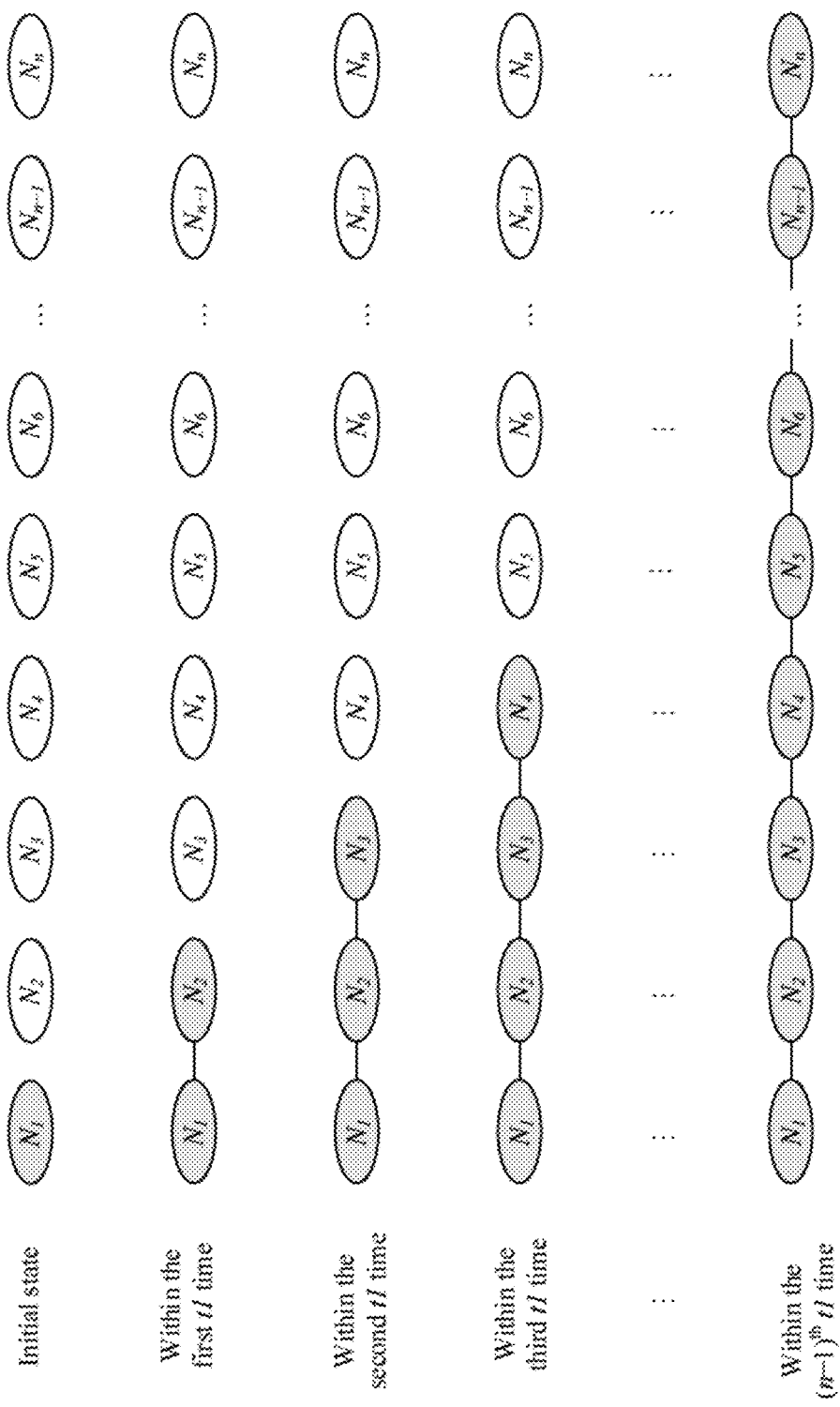

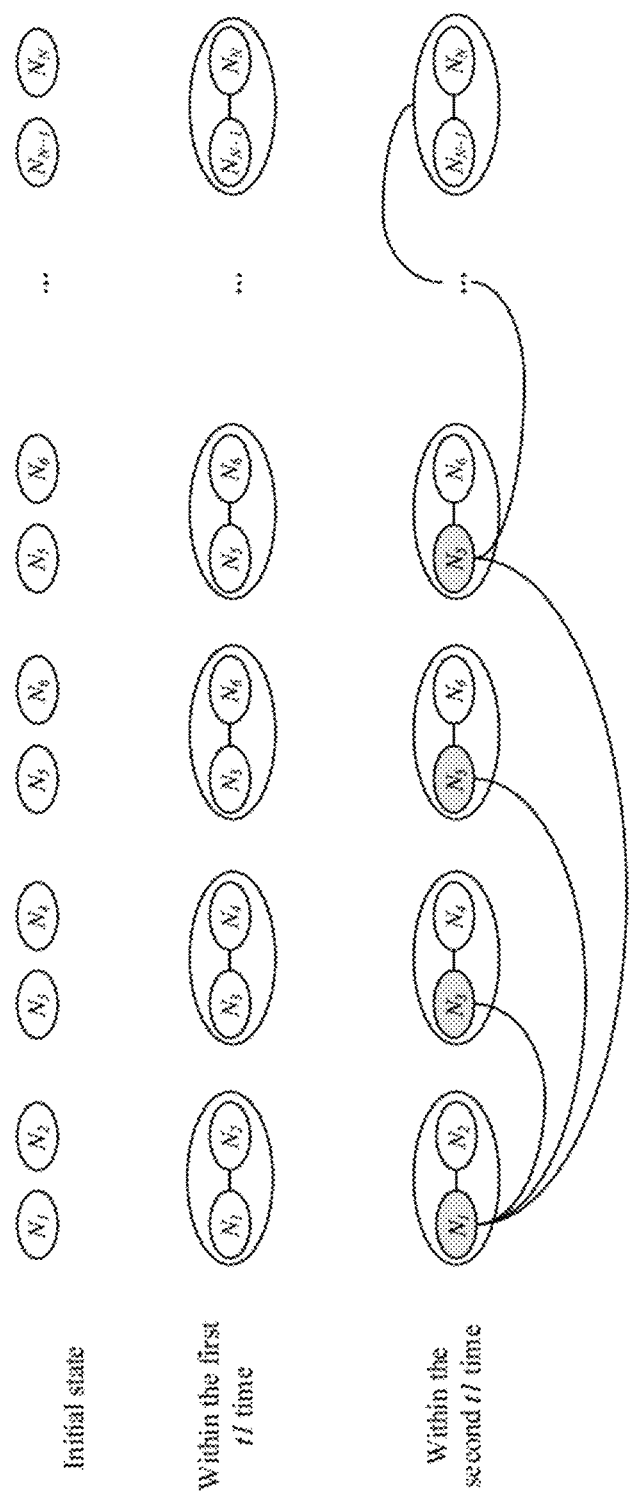

METHOD AND APPARATUS FOR ESTABLISHING TRUSTED COMPUTING CLUSTER

BACKGROUND

Technical Field

Implementations of the present specification relate to the field of trusted computing clusters, and in particular, to a method and an apparatus for establishing a trusted computing cluster.

Description of the Related Art

For security of computing and data transmission, trusted computing units are often used for trusted computing and data processing. The trusted computing unit can ensure security of code execution in the trusted computing unit, and an external entity (including an operating system or a driver) cannot obtain secrets such as internal runtime memory of the trusted computing unit. In an initial state, each trusted computing unit is not trusted. As a result, it cannot be ensured that information propagated between the trusted computing units is not disclosed. To ensure security of information transmission, a trusted computing cluster is established, that is, trust relationships are established between the trusted computing units, and a common encryption key is obtained through negotiation. When a plurality of trusted computing units have a same key, it is considered that the plurality of trusted computing units form a logical trusted computing cluster. The key cannot be cracked by any trusted computing unit other than both communication parties.

It is very time consuming to establish a trusted computing cluster related to a huge number of trusted computing units under conventional ways.

BRIEF SUMMARY

The present application provides a method and an apparatus for establishing a trusted computing cluster. The techniques can shorten the time used for establishing a trusted computing cluster.

According to a first aspect, a method for establishing a trusted computing cluster is provided. The method is used to form a trusted computing cluster by using N trusted computing units, the method including: grouping the N trusted computing units into a plurality of groups, each group of the plurality of groups including a number of trusted computing units not greater than K+1, K being a maximum number of trusted computing units with which a trusted computing unit of the N trusted computing unit simultaneously performs trust authentication; identifying a first trusted computing unit in each group, and causing first trusted computing units in the plurality of groups to each respectively perform inter-unit trust authentication with other trusted computing units in a same group in parallel; performing inter-group trust authentication between/among the plurality of groups in parallel to obtain the N trusted computing units on which trust authentication succeeds; and propagating secret information in the N trusted computing units on which trust authentication succeeds, so that the N trusted computing units obtain the same secret information to form the trusted computing cluster.

In an implementation, the inter-unit trust authentication includes: each trusted computing unit of two trusted computing units performing mutual trust authentication through following actions: obtaining a unit authentication report of other trusted computing unit of the two trusted computing units from the other trusted computing unit, and sending the unit authentication report of the other trusted computing unit to a third-party authentication institution for authentication; and sending a unit authentication report of the trusted computing unit to the other trusted computing unit for the other trusted computing unit to send the unit authentication report of the trusted computing unit to the third-party authentication institution for authentication.

In an implementation, the performing the inter-group trust authentication between/among the plurality of groups in parallel includes: causing the plurality of groups to each perform inter-group trust authentication with a neighboring group in a group sequence of the plurality of groups, in parallel.

In an implementation, the performing the inter-group trust authentication between/among the plurality of groups in parallel includes: causing at least one group in the plurality of groups to simultaneously perform inter-group trust authentication with a maximum of K other groups.

In an implementation, the inter-group trust authentication includes: identifying a second trusted computing unit in each group of the inter-group trust authentication, and causing second trusted computing units of the plurality of groups to perform inter-unit trust authentication among the second trusted computing units.

In an implementation, the propagating the secret information in the N trusted computing units on which trust authentication succeeds includes: identifying a third trusted computing unit in the N trusted computing units, identifying first data of the third trusted computing unit as the secret information, and causing the third trusted computing unit to simultaneously and separately send the secret information to M trusted computing units, M not exceeding a maximum number H of trusted computing units to which a trusted computing unit simultaneously sends the secret information.

In an implementation, the propagating the secret information in the N trusted computing units on which trust authentication succeeds includes: causing each of a plurality of trusted computing units that have the secret information to simultaneously and separately send the secret information to a plurality of trusted computing units that do not have the secret information.

In an implementation, the secret information is a cluster key.

According to a second aspect, an apparatus for establishing a trusted computing cluster is provided. The apparatus is configured to form a trusted computing cluster by using N trusted computing units, the apparatus including: a grouping unit, configured to group the N trusted computing units into a plurality of groups, each group of the plurality of groups including a number of trusted computing units not greater than K+1, K being a maximum number of trusted computing units with which a trusted computing unit of the N trusted computing unit simultaneously performs trust authentication; a first authentication unit, configured to identify a first trusted computing unit in each group, and cause first trusted computing units in the plurality of groups to each respectively perform inter-unit trust authentication with other trusted computing units in a same group in parallel; a second authentication unit, configured to perform inter-group trust authentication between/among the plurality of groups in parallel to obtain the N trusted computing units on which trust authentication succeeds; and a transmission unit, configured to propagate secret information in the N trusted computing units on which trust authentication succeeds, so that the N trusted computing units obtain the same secret information to form the trusted computing cluster.

In an implementation, the inter-unit trust authentication includes: each trusted computing unit of two trusted computing units performing mutual trust authentication through the following actions: obtaining a unit authentication report of other trusted computing unit of the two trusted computing units from the other trusted computing unit, and sending the unit authentication report of the other trusted computing unit to a third-party authentication institution for authentication; and sending a unit authentication report of the trusted computing unit to the other trusted computing unit for the other trusted computing unit to send the unit authentication report of the trusted computing unit to the third-party authentication institution for authentication.

In an implementation, the second authentication unit is specifically configured to cause the plurality of groups to each perform inter-group trust authentication with a neighboring group in a group sequence of the plurality of groups, in parallel.

In an implementation, the second authentication unit is specifically configured to cause at least one group in the plurality of groups to simultaneously perform inter-group trust authentication with a maximum of K other groups.

In an implementation, the inter-group trust authentication includes: identifying a second trusted computing unit in each group of the inter-group trust authentication, and causing second trusted computing units of the plurality of groups to perform inter-unit trust authentication among the second trusted computing units.

In an implementation, the transmission unit is specifically configured to identify a third trusted computing unit in the N trusted computing units, identify first data of the third trusted computing unit as the secret information, and cause the third trusted computing unit to simultaneously and separately send the secret information to M trusted computing units, M not exceeding a maximum number H of trusted computing units to which a trusted computing unit simultaneously sends the secret information.

In an implementation, the transmission unit is specifically configured to cause each of a plurality of trusted computing units that have the secret information to simultaneously and separately send the secret information to a plurality of trusted computing units that do not have the secret information.

In an implementation, the secret information is a cluster key.

According to a third aspect, a computer-readable storage medium is provided. The computer-readable storage medium stores a computer program, a computer being caused to perform the method according to the first aspect when the computer program is executed in the computer.

According to a fourth aspect, a computing device is provided, including a memory and a processor, the memory storing executable code, and the processor implementing the method according to the first aspect when executing the executable code.

Based on the method and the apparatus for establishing a trusted cluster provided in the implementations of the present specification, first, the N trusted computing units are grouped into the plurality of groups, and the number of trusted computing units included in each group is caused to be not greater than K+1; and one first trusted computing unit is identified in each group, and the first trusted computing units in the groups are caused to perform inter-unit trust authentication with the other trusted computing units in the same groups in parallel; then, inter-group trust authentication is performed between/among the plurality of groups in parallel to obtain the N trusted computing units on which trust authentication succeeds; and finally, the secret information is propagated in the N trusted computing units on which trust authentication succeeds, so that the N trusted computing units obtain the same secret information to form the trusted cluster of the N trusted computing units. As such, time for establishing a trusted cluster is shortened, and efficiency of establishing a trusted cluster is improved.

BRIEF DESCRIPTION OF THE SEVERAL VIEWS OF THE DRAWINGS

To describe the technical solutions in the plurality of implementations disclosed in the present specification more clearly, the following briefly describes the accompanying drawings required for describing the implementations. Apparently, the accompanying drawings in the following description show merely a plurality of implementations disclosed in the present specification, and a person of ordinary skill in the art can still derive other drawings from these accompanying drawings without creative efforts.

FIG. 2(a) is a schematic diagram illustrating an authentication process of establishing trust authentication between trusted computing units;

FIG. 7(b) is a schematic diagram illustrating another process of establishing trust authentication between groups according to an implementation;

DETAILED DESCRIPTION

The following describes the solutions in the implementations of the present specification with reference to the accompanying drawings.

Figure 1:
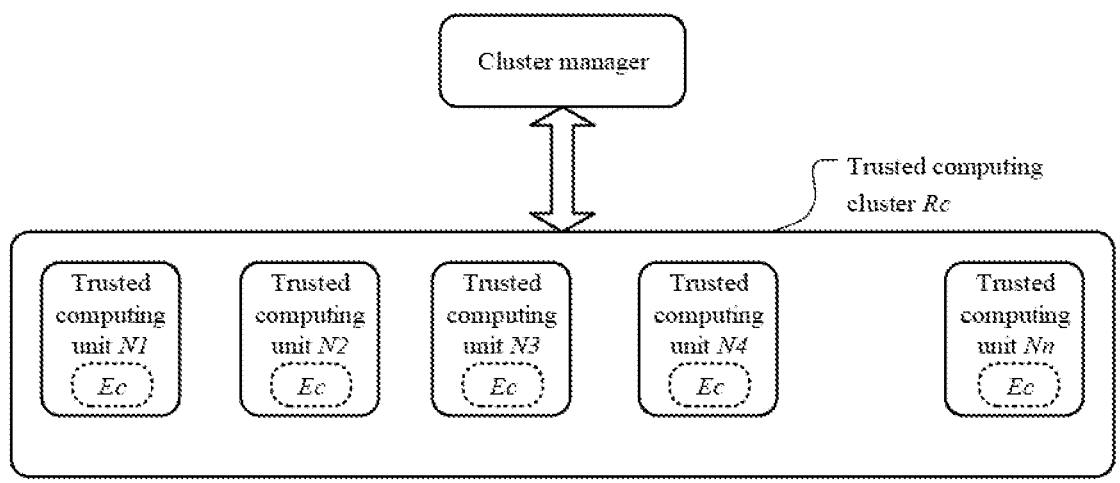
FIG. 1 is a schematic diagram illustrating a scenario according to an implementation of the present specification.

FIG. 1 is a schematic diagram illustrating a scenario according to an implementation of the present application. As shown in FIG. 1, a trusted computing cluster Rc is constructed by using a plurality of trusted computing units ($N_1, N_2, N_3, \ldots$, and $N_n$), the trusted computing units $N_1$, $N_2, N_3, \ldots$, and $N_n$ are all caused to maintain the same key Ec, and the key Ec is used as a cluster key of the trusted computing cluster Rc, to facilitate subsequent secret data transmission between/among the trusted computing units. Any data transmission between/among the trusted computing units is encrypted by using the cluster key Ec, thereby improving security of secret data transmission. The trusted computing cluster Rc is centrally managed by a cluster manager.

At least the following process is performed for forming the trusted computing cluster shown in FIG. 1 by using a plurality of trusted computing units: First, mutual trust authentication is performed between/among the plurality of trusted computing units to confirm that the other party is a trusted computing unit. Then, a key is propagated between/among the trusted computing units, so that the plurality of trusted computing units on which mutual trust authentication succeeds maintain the common key. As such, the trusted computing cluster is formed.

Figure 2B:
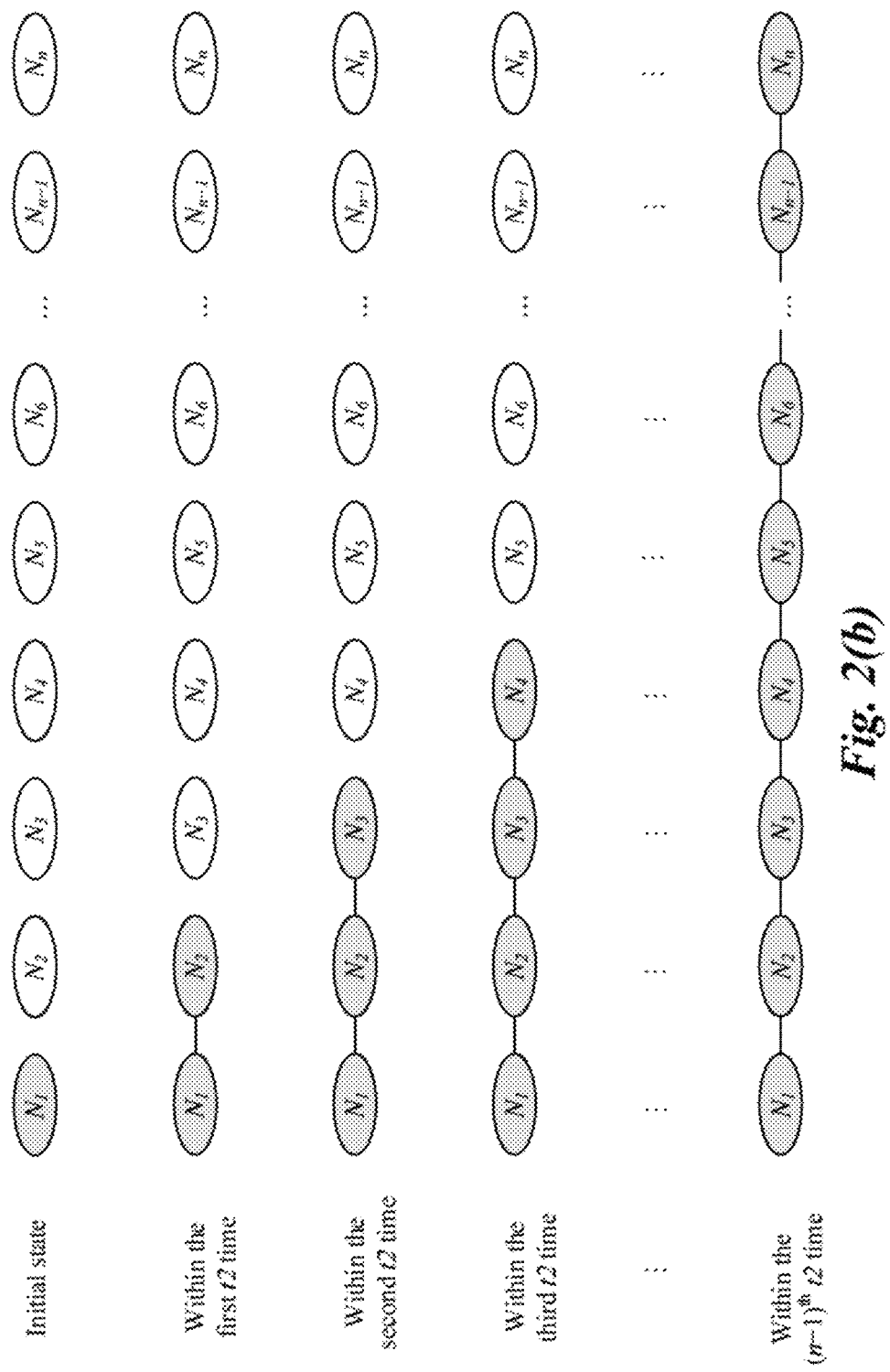
FIG. 2(b) is a schematic diagram illustrating a transmission process of transmitting a key between trusted computing units.

According to a solution, a trusted computing cluster is serially formed. FIG. 2(*a*) and FIG. 2(*b*) are schematic process diagrams of a method for establishing a trusted computing cluster. As shown in FIG. 2(*a*) and FIG. 2(*b*), the trusted computing cluster is serially established by using a central trusted computing unit. As described herein, establishment of a trusted cluster is divided into two processes. In the solution of serially establishing a trusted computing cluster, the first process is shown in FIG. 2(*a*), where trust authentication is serially established between/among n trusted computing units; the second process is shown in FIG. 2(*b*), where a key is serially propagated between/among the n trusted computing units after authentication on the n trusted computing units is completed in the first process of FIG. 2(*a*), so that all the trusted computing units have the common key. As such, a logical trusted computing cluster is formed.

It can be understood that time consumed for establishing the trusted computing cluster is also divided into two parts:

1. time consumed for establishing the trust authentication between/among the trusted computing units; and 2. time consumed for transmitting the key between/among the trusted computing units.

It is assumed that time t1 is required for completing mutual trust authentication between any two of the n trusted computing units, and one trusted computing unit can establish trust authentication with a maximum of K trusted computing units in parallel; and after trust authentication is completed, time t2 is required for sending the key to another trusted computing unit by a trusted computing unit, and a trusted computing unit can transmit the key to a maximum of H nodes in parallel.

In this case, as shown in FIG. 2(*a*), K=1 is used as an example for description. The n trusted computing units complete trust authentication with one another in a serial manner starting with or by the central trusted computing unit $N_1$, that is, the central trusted computing unit $N_1$ establishes trust authentication with a trusted computing unit $N_2$, and then the trusted computing unit $N_2$ establishes trust authentication with a trusted computing unit $N_3$. Similarly, trust authenticity is sequentially and serially established until the n trusted computing units complete trust authentication between/among one another, and required time T1=(n−1) *t1. In this case, if one trusted computing unit simultaneously establishes trusted authentication relationships with K trusted computing units, time T1=t1(n−1)/K needs to be consumed for completing trust authentication by the n trusted computing units.

After the n trusted computing units have completed trust authentication between/among one another, the central trusted computing unit $N_1$ starts propagating the key in a serial manner, as shown in FIG. 2(*b*). In FIG. 2(*b*), H=1 is used as an example for description. That is, the trusted computing units $N_1, N_2, N_3, \ldots$, and $N_n$ transmit the key one by one, so that the n trusted computing units have the same key to form the trusted computing cluster, and required time T2=t2(n−1). In this case, if one trusted computing unit simultaneously propagates the key to H trusted computing units, time T2=t2(n−1)/H needs to be consumed.

As such, total time consumed for serially establishing the trusted computing cluster by using the central trusted computing unit is as follows:

$$T=T1+T2=(n-1)/K*t1+(n-1)/H*t2.$$

To further shorten time for establishing a trusted computing cluster, the implementations of the present specification further provide a method and an apparatus for establishing a trusted computing cluster.

Figure 3:
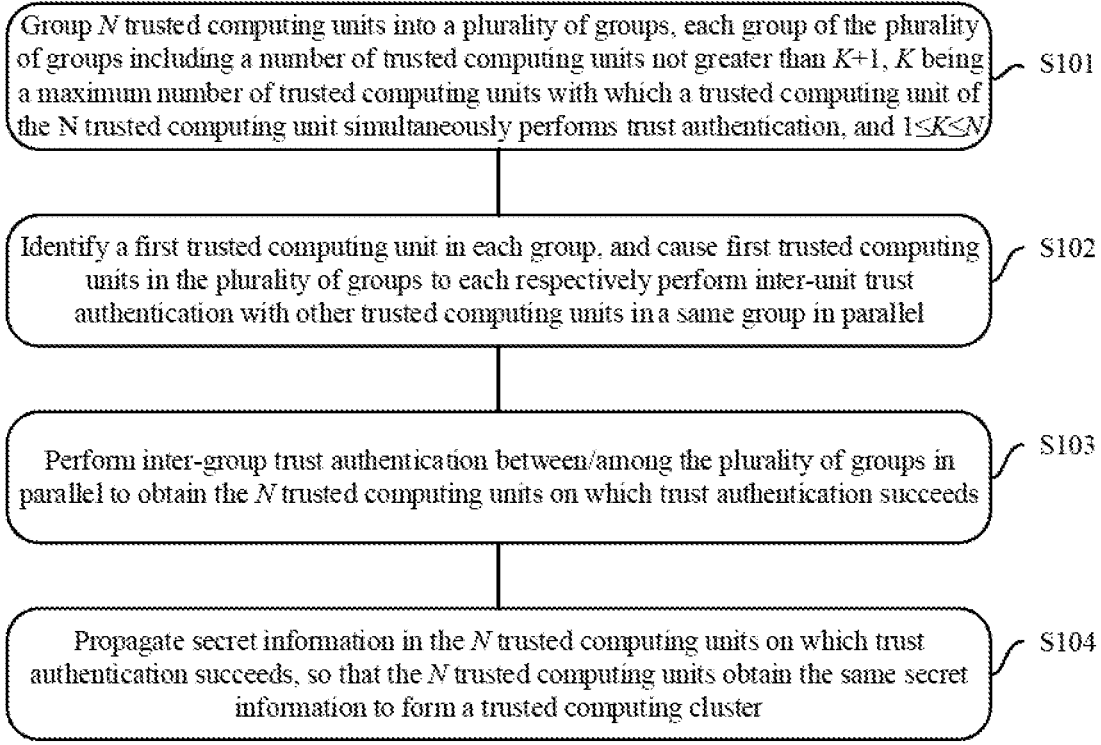
FIG. 3 is a schematic flowchart illustrating a method for establishing a trusted computing cluster according to an implementation.

FIG. 3 is a schematic flowchart illustrating a method for establishing a trusted computing cluster according to an implementation of the present application. The method is performed by a cluster manager, and is used to form a trusted computing cluster by using N trusted computing units. As shown in FIG. 3, the method can include the following steps.

In step S101, the N trusted computing units are grouped into a plurality of groups, each group of the plurality of groups including a number of trusted computing units not greater than K+1, K being a maximum number of trusted computing units with which a trusted computing unit of the N trusted computing unit simultaneously performs trust authentication, and 1≤K≤N.

It should be understood that a purpose of the grouping in this step is to cause trusted computing units in each group to complete mutual trust authentication within one authentication period t1. Therefore, a basis of the grouping is a parallel authentication capability of the trusted computing unit, that is, a maximum number of trusted computing units with which a trusted computing unit of the N trusted computing unit simultaneously performs trust authentication. If each trusted computing unit simultaneously performs trust authentication with a maximum of K other trusted computing units, the number of trusted computing units included in each group is caused to be not greater than K+1.

In an implementation, the parallel authentication capability K of the trusted computing unit depends on a computing capability of a central processing unit (CPU) of the trusted computing unit. In other possible implementations, the parallel authentication capability K of the trusted computing unit can depend on other factors such as network settings.

The cluster manager can learn the maximum trust authentication number K of each trusted computing unit in advance, and group the N trusted computing units accordingly.

In some implementations, the cluster manager can group the N trusted computing units into the plurality of groups based on a unique identifier such as a serial number of each trusted computing unit.

In some implementations, the groups obtained by the cluster manager are groups of a uniform size, that is, the groups include the same number of trusted computing units.

In some implementations, the groups obtained by the cluster manager are groups of non-uniform sizes, that is, the groups include different numbers of trusted computing units. For example, a group can include one trusted computing unit, a group can include two trusted computing units, another group includes four trusted computing units, etc.

Then, in step S102, a first trusted computing unit is identified in each group, and first trusted computing units in the plurality of groups are caused to each respectively perform inter-unit trust authentication with other trusted computing units in a same group in parallel.

The cluster manager may randomly identify one trusted computing unit in each group as the first trusted computing unit, and then perform inter-unit trust authentication between/among the first trusted computing units in the groups and the other trusted computing units in the same groups in parallel.

Figure 4A:
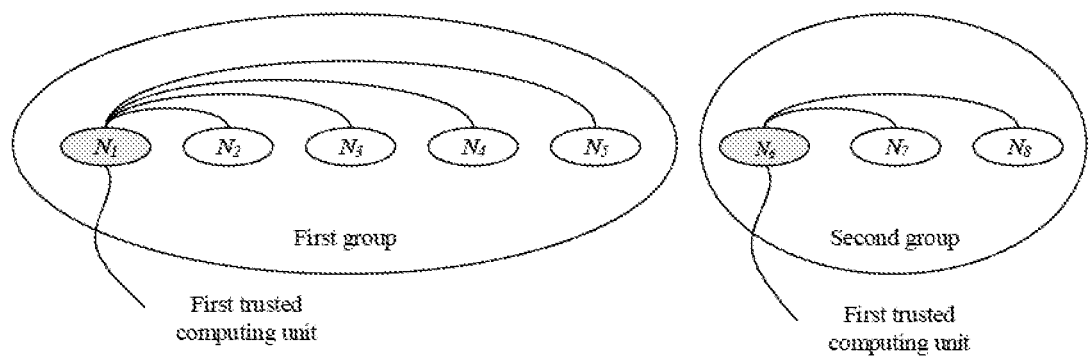
FIG. 4(a) is a schematic diagram illustrating a process of establishing trust authentication between trusted computing units according to an implementation.

As shown in FIG. 4(a), two groups are used as an example. A first group includes five trusted computing units ($N_1$, $N_2$, $N_3$, $N_4$, and $N_5$), and a second group includes three trusted computing units ($N_6$, $N_7$, and $N_8$). The cluster manager specifies $N_1$ in the first group as a first trusted computing unit, and specifies $N_6$ in the second group as a first trusted computing unit. A process in which the two groups establish trust authentication relationships in parallel is as follows: $N_1$ in the first group separately and simultaneously establishes trust authentication with $N_2$, $N_3$, $N_4$, and $N_5$; and meanwhile, $N_6$ in the second group separately and simultaneously establishes trust authentication with $N_7$ and $N_8$. As such, the two groups perform the trust authentication in parallel. Therefore, time consumed for the trust authentication process is equivalent to time for establishing trust authentication between two trusted computing units, that is, one authentication period t1.

Figure 4B:
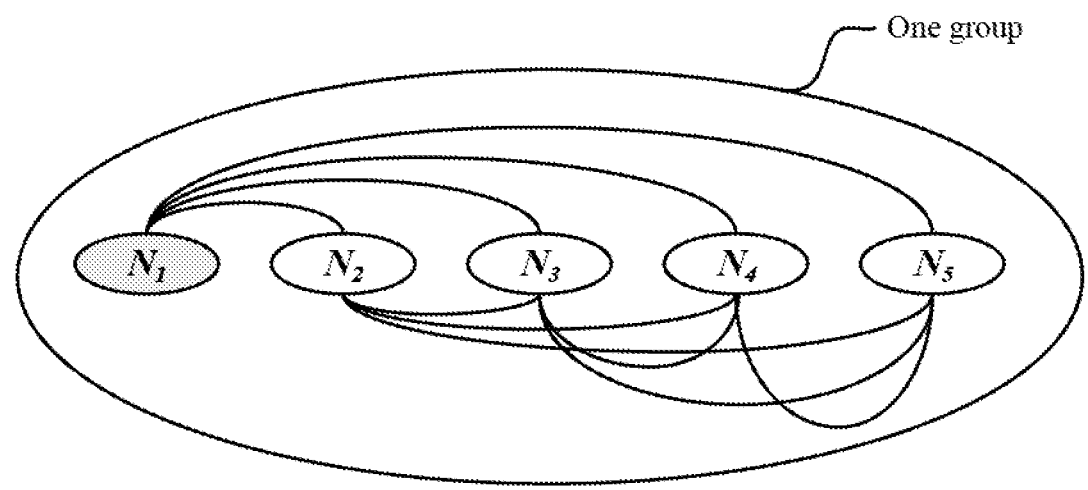
FIG. 4(b) is a schematic diagram illustrating another process of establishing trust authentication between trusted computing units according to an implementation.

In some implementations, any trusted computing unit in each group can separately establish trust authentication with other trusted computing units in the same group in parallel, as shown in FIG. 4(b). In FIG. 4(b), the first group in FIG. 4(a) is used as an example for description. The trusted computing units $N_1$, $N_2$, $N_3$, $N_4$, and $N_5$ in the group perform mutual trust authentication.

Figure 5:
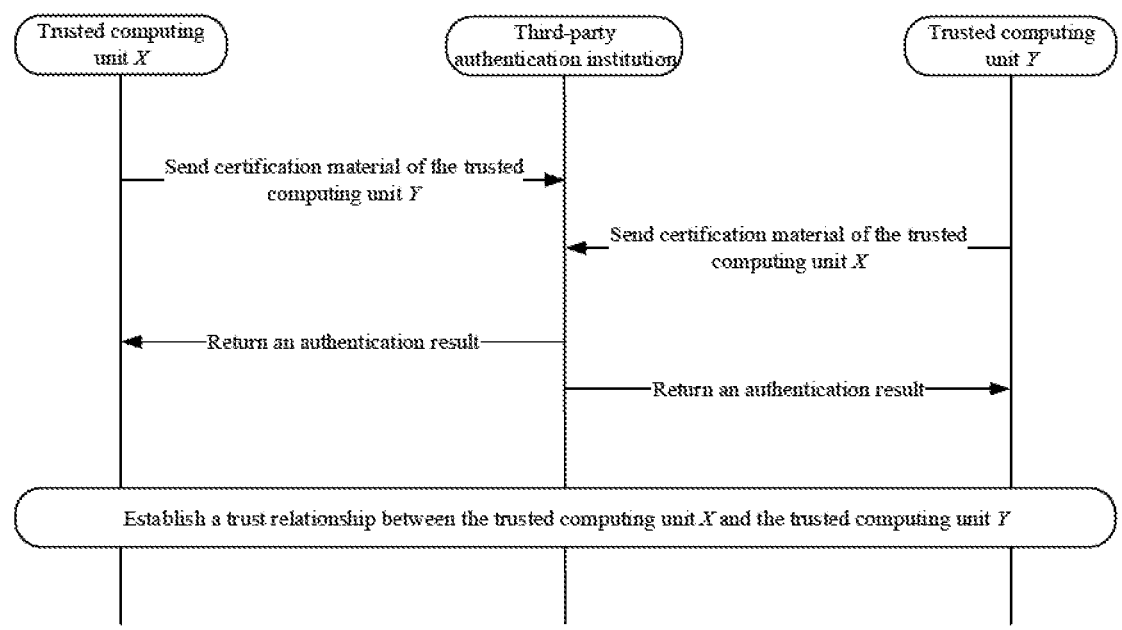
FIG. 5 is a schematic diagram illustrating a process of establishing trust authentication between two trusted computing units according to an implementation.

In some implementations, inter-unit trust authentication between any two trusted computing units includes the following steps performed by each of the two trusted computing units to perform mutual trust authentication, as shown in FIG. 5.

In some implementations, a trusted computing unit X obtains a unit authentication report, including, for example, a certificate and signature information, of a trusted computing unit Y from the trusted computing unit Y, sends the unit authentication report to a third-party authentication institution for authentication, and receives an authentication result sent by the third-party authentication institution. Simultaneously, the trusted computing unit X sends a unit authentication report of the trusted computing unit X to the trusted computing unit Y, so that the trusted computing unit Y sends the unit authentication report to the third-party authentication institution for authentication, and receives an authentication result sent by the third-party authentication institution.

If both the authentication results by the third-party authentication institution authenticate, respectively, that the trusted computing unit X and the trusted computing unit Y are trusted authentication units, a trusted relationship is established between the trusted computing unit X and the trusted computing unit Y; or if either one of the results of authenticating the trusted computing unit X or authenticating the trusted computing unit Y by the third-party authentication institution indicates an untrusted authentication unit, no trusted relationship is established between the trusted computing unit X and the trusted computing unit Y.

Then, in step S103, inter-group trust authentication is performed between/among the plurality of groups in parallel to obtain the N trusted computing units on which trust authentication succeeds.

After completing S101 and S102, that is, after grouping the N trusted computing units and establishing the trust authentication between/among the trusted computing units in each of the groups in parallel, the cluster manager performs trust authentication between/among the groups in parallel.

Figure 6A:
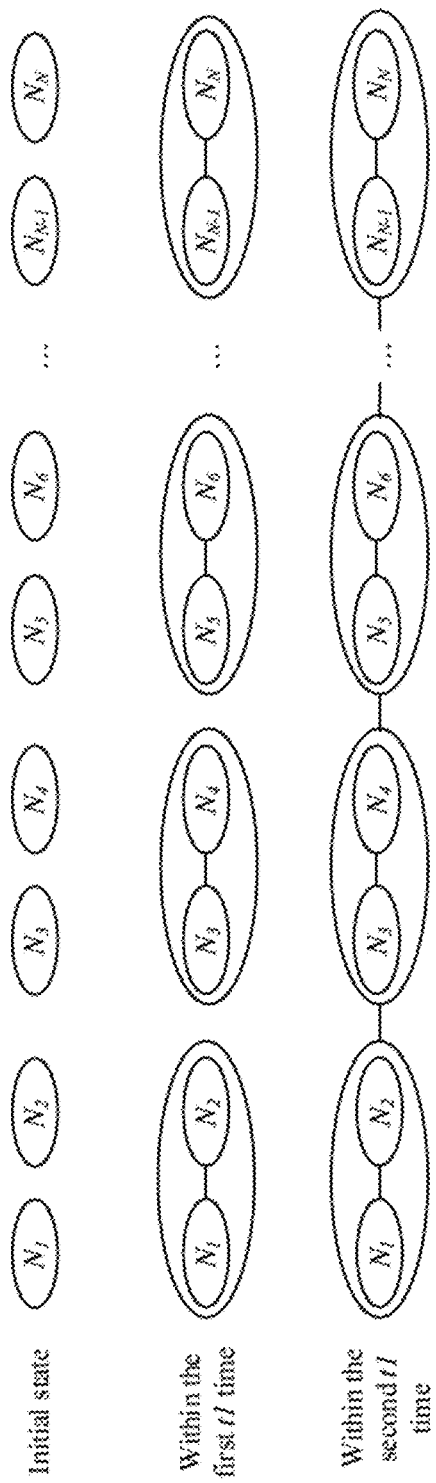
FIG. 6(a) is a schematic diagram illustrating a process of establishing trust authentication between groups according to an implementation.

In implementations, when performing grouping, the cluster manager sets a group serial number for each group, and when performing inter-group trust authentication between/among the plurality of groups in parallel, the cluster manager performs inter-group trust authentication between/among groups with adjacent group serial numbers in parallel, as shown in FIG. 6(a).

In FIG. 6(a), K=1 is used as an example for description. No trust authentication is established between/among the N trusted computing units in an initial state. Within the first t1 time period, the N trusted computing units are grouped into the plurality of groups, and an inter-unit trust authentication is established between/among trusted computing units in each group. Within the second t1 time period, inter-group trust authentication is established between groups with adjacent group serial numbers.

Figure 6B:
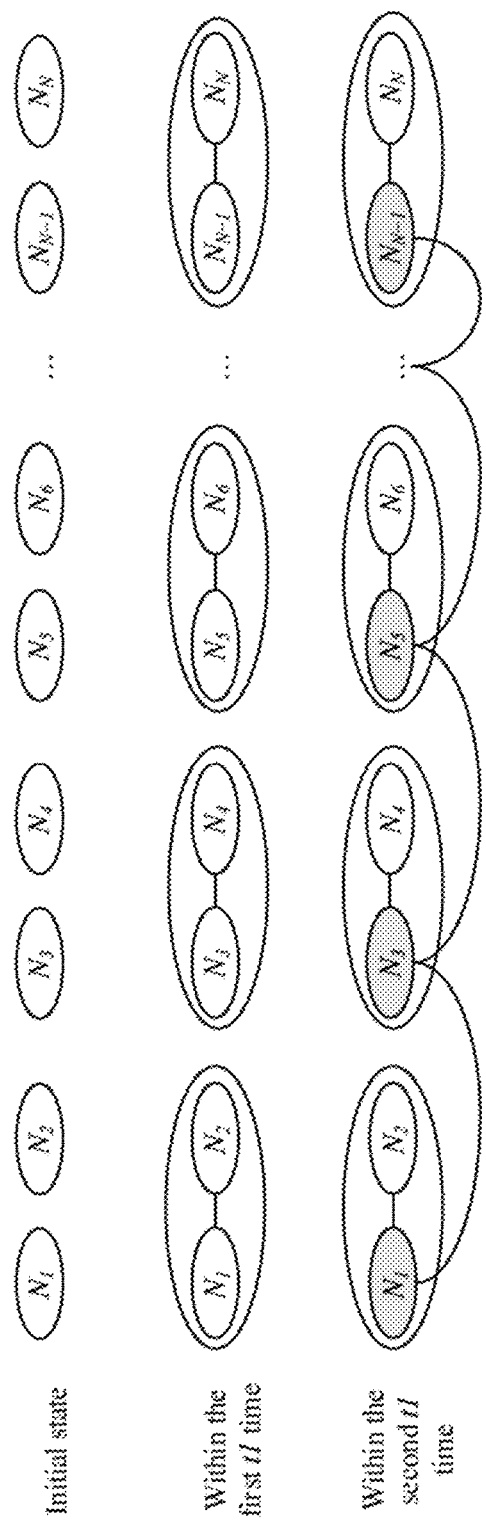
FIG. 6(b) is a schematic diagram illustrating another process of establishing trust authentication between groups according to an implementation.

In an implementation, the establishing the inter-group trust authentication between/among the groups can be specifically as follows: As shown in FIG. 6(b), first, the cluster manager randomly specifies one trusted computing unit in each group as a second trusted computing unit. In this implementation, the second trusted computing unit identified in each group can be the same as or different from the first trusted computing unit identified in S102. This is not limited in this implementation.

Then, the cluster manager causes trust authentication to be established between second trusted computing units in the groups. As shown in FIG. 6(b), the second trusted computing unit in each group establishes a trust connection to a second trusted computing unit in a neighboring group. For example, in FIG. 6(b), each group establishes trust authentication with one group in parallel.

Figure 7A:
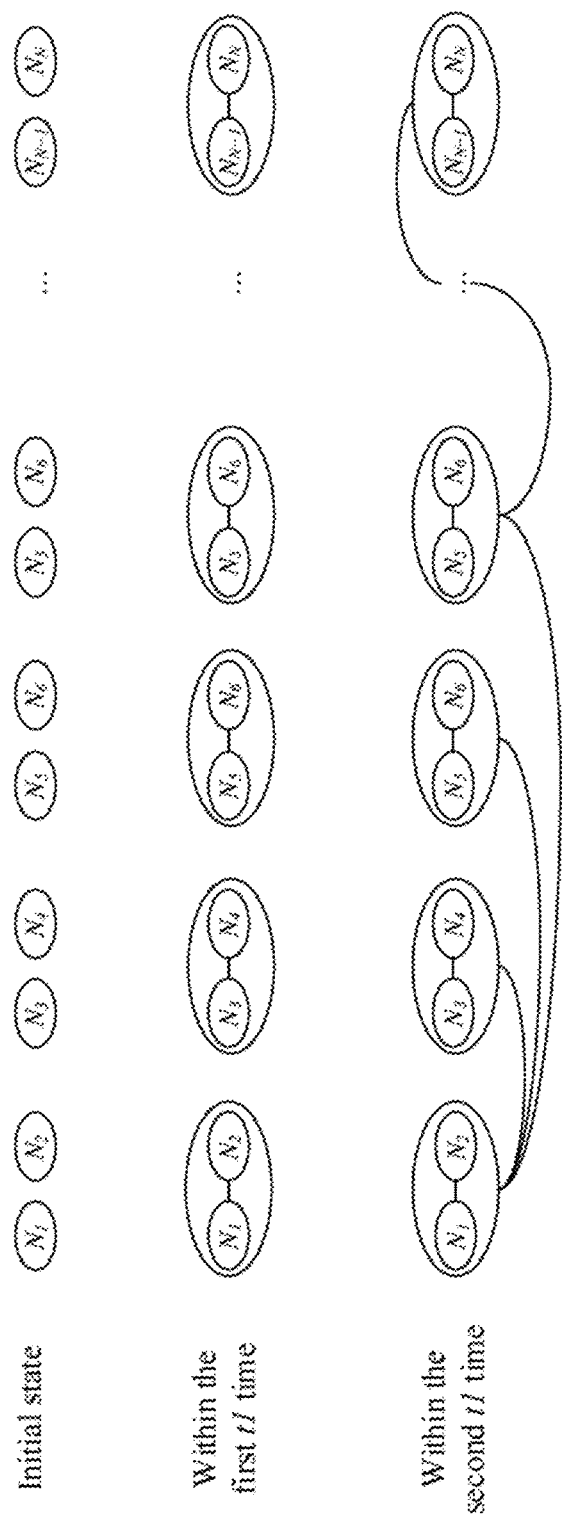
FIG. 7(a) is a schematic diagram illustrating another process of establishing trust authentication between groups according to an implementation.

Optionally, in another implementation, the performing the inter-group trust authentication between/among the plurality of groups in parallel includes: the cluster manager causes at least one group in the plurality of groups to simultaneously perform inter-group trust authentication with a maximum of K other groups. In other words, a certain group in the plurality of groups performs inter-group trust authentication with K groups in parallel, as shown in FIG. 7(a). In FIG. 7(a), only K=3 is used as an example for description.

Correspondingly, the inter-group trust authentication performed by the certain group with the K groups in parallel can be specifically as follows: The cluster manager specifies one second trusted computing unit for each group, which is the same as the case in FIG. 6(b). The second trusted computing unit identified in each group can be the same as or different from the first trusted computing unit identified in S102. This is not limited in this implementation. Within the second t1 time period, a second trusted computing unit in the certain group simultaneously establishes trust authentication with second trusted computing units in K other groups, as shown in FIG. 7(b). In FIG. 7(b), K=3 is used as an example for description.

In S103, in some implementations, time consumed for establishing trust authentication between/among groups is equivalent to time (t1) for establishing trust authentication between two trusted computing units.

Therefore, total time consumed for establishing the trust authentication between/among the N trusted computing units is 2*t1.

In step S104, secret information is propagated in the N trusted computing units on which trust authentication succeeds, so that the N trusted computing units obtain the same secret information to form the trusted computing cluster.

In an implementation, the cluster manager randomly specifies one of the N trusted computing units as a third trusted computing unit. The third trusted computing unit can be a first trusted computing unit that is in a specific group and that is identified by the cluster manager in S102, or can be any trusted computing unit in any group other than the first trusted computing unit; or can be a second trusted computing unit that is in a specific group and that is identified by the cluster manager in S103, or can be any trusted computing unit in any group other than the second trusted computing unit.

The cluster manager specifies first data of the third trusted computing unit as the secret information. In an implementation, the secret information can be a key. In other implementations, the secret information can be other secret data that subsequently needs to be maintained or propagated in the trusted computing cluster. Then, the cluster manager causes the third trusted computing unit to simultaneously and separately send the secret information to M trusted computing units, M doing not exceed H, and H being a maximum number of other trusted computing units to which a trusted computing unit simultaneously sends the secret information. Similarly, the maximum number H for sending the secret information in parallel can depend on, for example, a CPU processing capability or network settings.

After the first propagation performed by the third trusted computing unit, a part of the plurality of trusted computing units has the secret information, and the other part does not have the secret information. In an implementation, the propagating the secret information in the N trusted computing units on which trust authentication succeeds further includes: causing each of a plurality of trusted computing units that have the secret information to simultaneously and separately send the secret information to a plurality of trusted computing units that do not have the secret information, so that the N trusted computing units obtain the same key to form the trusted computing cluster of the N trusted computing nodes.

Figure 8A:
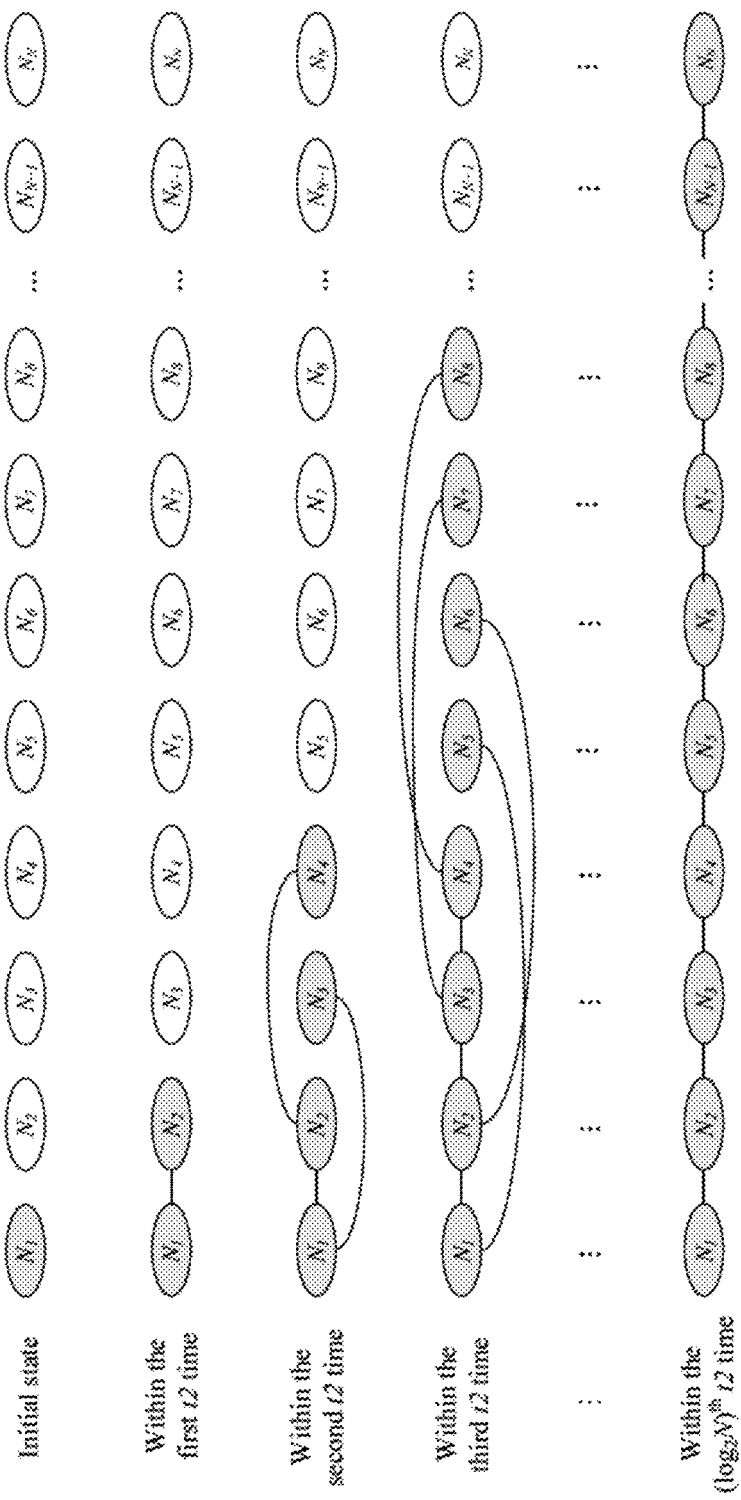
FIG. 8(a) is a schematic diagram illustrating a process of transmitting a key between trusted computing units according to an implementation.

For example, it is assumed that H=1, time t2 is consumed for transmitting the key between two trusted computing units, and a process of transmitting the key between/among the N trusted computing units is shown in FIG. 8(a). First, the key is transmitted by a trusted computing unit $N_1$ to a trusted computing unit $N_2$, which consumes time t2. Then, the trusted computing unit $N_1$ transmits the key to a trusted computing unit $N_3$ and the trusted computing unit $N_2$ transmits the key to a trusted computing unit $N_4$ in parallel, which consumes time t2. Further, the trusted computing unit $N_1$ transmits the key to a trusted computing unit $N_5$, the trusted computing unit $N_2$ transmits the key to a trusted computing unit $N_6$, the trusted computing unit $N_3$ transmits the key to a trusted computing unit $N_7$, and the trusted computing unit $N_4$ transmits the key to a trusted computing unit $N_8$, which consumes time t2. In the same propagation mode, trusted computing units that obtain the key separately transmit the key in parallel to trusted computing units that do not obtain the key until the N trusted computing units obtain the key to form a trusted computing cluster of the N trusted computing units.

Time $(\log_{(H+1)}N)*t2$ needs to be consumed for transmitting the key between/among the N trusted computing units until each of the N trusted computing units obtains the key.

In this implementation, K and H can be the same value, or can be different values. However, considering a CPU parallel computing capability of each trusted computing unit, in a key transmission process, a smaller value (e.g., min(H, K)) in K and H is selected as a value for parallel key transmission. In other words, each of the N trusted computing units can separately send the key to min(H, K) trusted computing units in parallel. As such, time $(\log_{(min(H,K)+1)}N)*t2$ needs to be consumed for transmitting the key between/among the N trusted computing units until each of the N trusted computing units obtains the key.

Because time 2*t1 is consumed for performing trust authentication in the first phase, in this implementation, total time required for completing establishment of the trusted computing cluster of the N trusted computing units is:

$$T=2*t1+(\log_{(min(H,K))}N)*t2$$

According to the method for establishing a trusted computing cluster, time for establishing a trusted computing cluster is shortened, and efficiency of establishing a trusted computing cluster is improved.

Figure 8B:
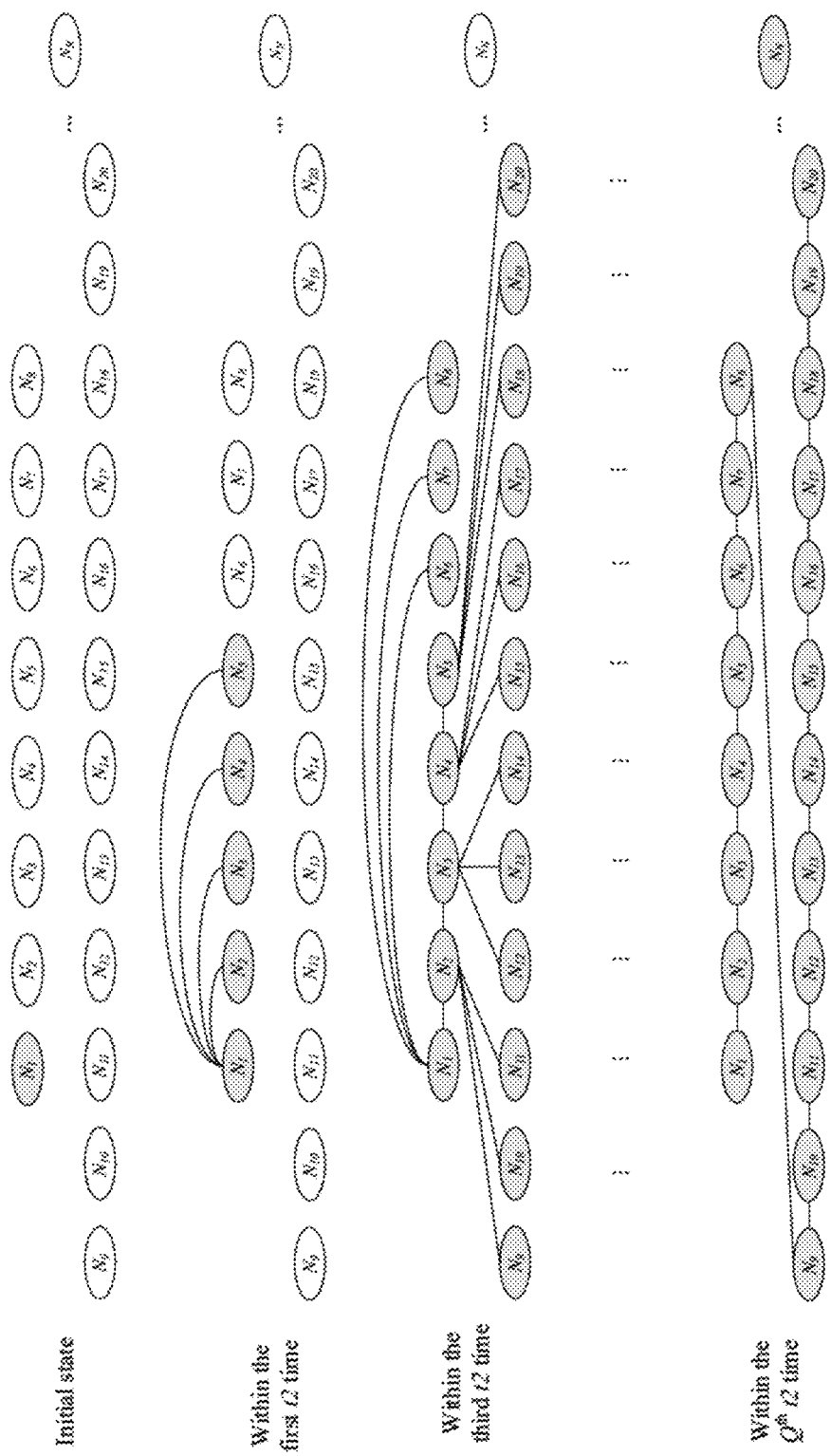
FIG. 8(b) is a schematic diagram illustrating another process of transmitting a key between trusted computing units according to an implementation.

In another implementation, when the key is transmitted between/among the N trusted computing units, each node in the N trusted computing units can non-uniformly and concurrently transmit the key to other trusted computing units that do not obtain the key. For example, the maximum number H of trusted computing units to which one trusted computing unit can send the key is equal to 4. As shown in FIG. 8(b), within the first t2 time, a trusted computing unit $N_1$ separately transmits the key to four trusted computing units ($N_2$, $N_3$, $N_4$, and $N_5$) in parallel; and within the second t2 time, the trusted computing units $N_1$, $N_2$, $N_3$, $N_4$, and $N_5$ can separately transmit the key in parallel to three trusted computing units that do not obtain the key, for example, $N_1$ transmits the key to $N_6$, $N_7$, and $N_8$, $N_2$ transmits the key to $N_9$, $N_{10}$, and $N_{11}$, $N_3$ transmits the key to $N_{12}$, $N_{13}$, and $N_{14}$, $N_4$ transmits the key to $N_{15}$, $N_{16}$, and $N_{17}$, and $N_5$ transmits the key to $N_{18}$, $N_{19}$, and $N_{20}$. Subsequently, within the third t2 time, the trusted computing units $N_1$ to $N_{20}$ that obtain the key can concurrently and separately transmit the key to trusted computing units (less than or equal to four trusted computing units) that do not obtain the key until the N trusted computing units all obtain the key to construct a trusted computing cluster of the N trusted computing units. In a process of propagating the key, Q*t2 time needs to be consumed, and $\log_{(min(H,K)+1)}N<Q<\log_2 N$. The maximum time consumed for establishing the trusted computing cluster through calculation is greater than $2*t1+(\log_{(min(H,K)+1)}N)*t2$ and is less than $2*t1+(\log_2 N)*t2$.

$(\log_2 N)*t2$ is time consumed for concurrently propagating the key between/among the N trusted computing units (H=1). As shown in FIG. 7(a), time required for obtaining the key by all the N trusted computing units is $(\log_2 N)*t2$.

In an implementation, when the key is transmitted between/among the N trusted computing units, different H values for concurrent key transmission can be set for the trusted computing units, and the maximum time required for obtaining the key by all the N trusted computing units is $(\log_2 N)*t2$. The maximum total time consumed for establishing the trusted computing cluster is $T=2*t1+(\log_2 N)*t2$. Compared with a conventional solution, the time for establishing the trusted computing cluster is shortened.

In some implementations, if the CPU computing capability is powerful enough, the cluster manager can directly perform trust authentication between/among the N trusted computing units in parallel without performing grouping, thereby further shortening the time for establishing the trusted cluster.

FIG. 2(a) and FIG. 2(b) to FIG. 8(a) and FIG. 8(b) describe the process of establishing the trusted computing cluster. The following describes the apparatus provided in the implementations of the present application with reference to FIG. 9.

Figure 9:
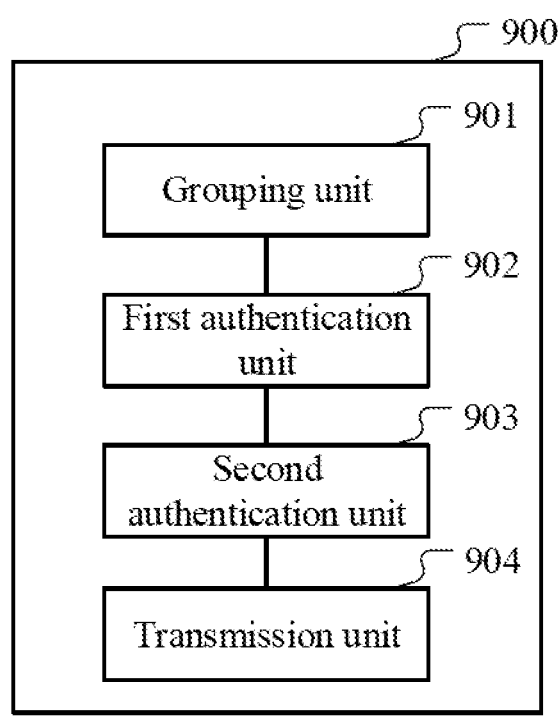
FIG. 9 is a schematic structural diagram illustrating an apparatus for establishing a trusted computing cluster according to an implementation.

As shown in FIG. 9, the apparatus 900 is configured to form a trusted computing cluster by using N trusted computing units, the apparatus 900 including: a grouping unit 901, configured to group the N trusted computing units into a plurality of groups, each group of the plurality of groups including a number of trusted computing units not greater than K+1, K being a maximum number of trusted computing units with which a trusted computing unit of the N trusted computing unit simultaneously performs trust authentication; a first authentication unit 902, configured to identify a first trusted computing unit in each group, and cause first trusted computing units in the plurality of groups to each respectively perform inter-unit trust authentication with other trusted computing units in a same group in parallel; a second authentication unit 903, configured to perform inter-group trust authentication between/among the plurality of groups in parallel to obtain the N trusted computing units on which trust authentication succeeds; and a transmission unit 904, configured to propagate secret information in the N trusted computing units on which trust authentication succeeds, so that the N trusted computing units obtain the same secret information to form the trusted computing cluster.

Optionally, in an implementation, the inter-unit trust authentication includes: each trusted computing unit of two trusted computing units performing mutual trust authentication through following actions: obtaining a unit authentication report of other trusted computing unit of the two trusted computing units from the other trusted computing unit, and sending the unit authentication report of the other trusted computing unit to a third-party authentication institution for authentication; and sending a unit authentication report of the trusted computing unit to the other trusted computing unit for the other trusted computing unit to send the unit authentication report of the trusted computing unit to the third-party authentication institution for authentication.

In an implementation, the second authentication unit 903 is specifically configured to identify the plurality of group with a group sequence of the plurality of groups and cause the plurality of groups to each perform inter-group trust authentication with a neighboring group in a group sequence of the plurality of groups, in parallel. The group sequence may be identified randomly or may follow some determined rules.

Optionally, in another implementation, the second authentication unit 903 is specifically configured to cause at least one group in the plurality of groups to simultaneously perform inter-group trust authentication with a maximum of K other groups.

Further, in an implementation, the inter-group trust authentication includes: identifying a second trusted computing unit in each group of the inter-group trust authentication, and causing inter-unit trust authentication to be performed between/among second trusted computing units.

In an implementation, the transmission unit 904 is specifically configured to identify a third trusted computing unit in the N trusted computing units, identify first data of the third trusted computing unit as the secret information, and cause the third trusted computing unit to simultaneously and separately send the secret information to M trusted computing units, M not exceeding a maximum number H of trusted computing units to which a trusted computing unit simultaneously sends the secret information.

In an implementation, the transmission unit 904 is specifically configured to cause each of a plurality of trusted computing units that have the secret information to simultaneously and separately send the secret information to a plurality of trusted computing units that do not have the secret information.

Optionally, in an implementation, the secret information is a cluster key.

The apparatus forms the trusted computing cluster by using the N trusted computing units. The N trusted computing units must first perform bidirectional mutual identity authentication, and the key is transmitted only when the dual-party authentication succeeds, so that all the N trusted computing units have the same key as the cluster key.

In addition, according to the method in FIG. 3, first, the N trusted computing units are grouped, trust authentication between/among trusted computing units in the groups is established in parallel, and trust authentication between/among the groups is established in parallel, to form the N trusted computing units on which trust authentication succeeds; and then, the secret information is propagated between/among the N trusted computing units, so that all the N trusted computing units obtain the secret information to obtain the trusted computing cluster of the N trusted computing units, thereby shortening time for establishing the trusted computing cluster.

An implementation of the present application further provides a computer-readable storage medium. The computer-readable storage medium stores a computer program, a computer being caused to perform the method described with reference to FIG. 3 when the computer program is executed in the computer.

An implementation of the present application further provides a computing device, including a memory and a processor, the memory storing executable code, and the processor implementing the method described with reference to FIG. 3 when executing the executable code.

A person skilled in the art should be aware that in the above one or more examples, the functions described in the plurality of implementations disclosed in the present specification can be implemented by using hardware, software, firmware, or any combination thereof. When the functions are implemented by using software, the functions can be stored in a computer-readable medium or transmitted as one or more instructions or code in the computer-readable medium.

In the above specific implementations, the objectives, technical solutions, and benefits of the plurality of implementations disclosed in the present specification are further described in detail. It should be understood that the above descriptions are merely specific implementations of the plurality of implementations disclosed in the present specification, but are not intended to limit the protection scope of the plurality of implementations disclosed in the present specification. Any modification, equivalent replacement, improvement, etc., made based on the technical solutions in the plurality of implementations disclosed in the present specification shall fall within the protection scope of the plurality of implementations disclosed in the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for establishing a trusted computing cluster, the method comprising:
    grouping a plurality of computing units into a plurality of groups, each group of the plurality of groups including a number of computing units not greater than K+1, K being a maximum number of computing units with which a computing unit of the plurality of computing units performs trust authentication in parallel;
    identifying a first trusted computing unit in each group, and causing first trusted computing units in the plurality of groups to each respectively perform inter-unit trust authentication with other computing units in a same group in parallel;
    performing inter-group trust authentication among the plurality of groups in parallel to obtain N trusted computing units on which trust authentication succeeds; and
    forming the trusted computing cluster by propagating first secret information in the N trusted computing units on which trust authentication succeeds for the N trusted computing units to each obtain the first secret information.

2. The method according to claim 1, wherein the inter-unit trust authentication includes:
    each computing unit of two computing units performing mutual trust authentication through following actions:
        obtaining a unit authentication report of other computing unit of the two computing units from the other computing unit, and sending the unit authentication report of the other computing unit to a third-party authentication institution for authentication; and
        sending a unit authentication report of the computing unit to the other computing unit for the other computing unit to send the unit authentication report of the computing unit to the third-party authentication institution for authentication.

3. The method according to claim 1, wherein the performing the inter-group trust authentication among the plurality of groups in parallel includes:
    identifying the plurality of groups with a group sequence of the plurality of groups; and
    causing the plurality of groups to each perform inter-group trust authentication with a neighboring group in the group sequence of the plurality of groups, in parallel.

4. The method according to claim 1, wherein the performing the inter-group trust authentication among the plurality of groups in parallel includes:
    causing at least one group in the plurality of groups to simultaneously perform inter-group trust authentication with a maximum of K other groups.

5. The method according to claim 1, wherein the inter-group trust authentication includes:
    identifying a second trusted computing unit in each group of the inter-group trust authentication, and causing second trusted computing units of the plurality of groups to perform inter-unit trust authentication among the second trusted computing units.

6. The method according to claim 1, wherein the propagating the first secret information in the N trusted computing units includes:
    identifying a third trusted computing unit in the N trusted computing units, identifying first data of the third trusted computing unit as the first secret information, and causing the third trusted computing unit to separately send the first secret information to M trusted computing units, M not exceeding a maximum number of trusted computing units to which a trusted computing unit simultaneously sends the first secret information.

7. The method according to claim 6, wherein the propagating the first secret information in the N trusted computing units includes:
    causing each of a plurality of trusted computing units that have the first secret information to separately send the first secret information to a plurality of trusted computing units that do not have the first secret information.

8. The method according to claim 1, wherein the first secret information is a cluster key.

9. An apparatus for establishing a trusted computing cluster, the apparatus comprising:
    a grouping unit, configured to group trusted plurality of computing units into a plurality of groups, each group of the plurality of groups including a number of computing units not greater than K+1, K being a maximum number of computing units with which a computing unit of the plurality of computing units performs trust authentication in parallel;
    a first authentication unit, configured to identify a first trusted computing unit in each group, and cause first trusted computing units in the plurality of groups to each respectively perform inter-unit trust authentication with other computing units in a same group in parallel;
    a second authentication unit, configured to perform inter-group trust authentication among the plurality of groups in parallel to obtain N trusted computing units on which trust authentication succeeds; and
    a transmission unit, configured to form the trusted computer cluster by propagating first secret information in the N trusted computing units for the N trusted computing units to each obtain the first secret information.

10. The apparatus according to claim 9, wherein the inter-unit trust authentication includes:
    each computing unit of two computing units performing mutual trust authentication through following actions:

obtaining a unit authentication report of other computing unit of the two computing units from the other computing unit, and sending the unit authentication report of the other computing unit to a third-party authentication institution for authentication; and sending a unit authentication report of the computing unit to the other computing unit for the other computing unit to send the unit authentication report of the computing unit to the third-party authentication institution for authentication.

11. The apparatus according to claim 9, wherein the second authentication unit is configured to:

identify the plurality of groups with a group sequence of the plurality of groups; and cause the plurality of groups to each perform inter-group trust authentication with a neighboring group in the group sequence of the plurality of groups, in parallel.

12. The apparatus according to claim 9, wherein the second authentication unit is configured to:

cause at least one group in the plurality of groups to simultaneously perform inter-group trust authentication with a maximum of K other groups.

13. The apparatus according to claim 9, wherein the inter-group trust authentication includes:

identifying a second trusted computing unit in each group of the inter-group trust authentication, and causing second trusted computing units of the plurality of groups to perform inter-unit trust authentication among the second trusted computing units.

14. The apparatus according to claim 9, wherein the transmission unit is configured to:

identify a third trusted computing unit in the N trusted computing units, identify first data of the third trusted computing unit as the first secret information, and cause the third trusted computing unit to separately send the first secret information to M trusted computing units, M not exceeding a maximum number of trusted computing units to which a trusted computing unit simultaneously sends the first secret information.

15. The apparatus according to claim 14, wherein the transmission unit is configured to:

cause each of a plurality of trusted computing units that have the first secret information to separately send the first secret information to a plurality of trusted computing units that do not have the first secret information.

16. The apparatus according to claim 9, wherein the first secret information is a cluster key.

17. A computing device, comprising a memory and a processor, the memory storing executable codes, and the processor executing the executable codes to implement acts including:

grouping a plurality of computing units into a plurality of groups, each group of the plurality of groups including a number of computing units not greater than K+1, K being a maximum number of computing units with which a computing unit of the plurality of computing units performs trust authentication in parallel;

identifying a first trusted computing unit in each group, and causing first trusted computing units in the plurality of groups to each respectively perform inter-unit trust authentication with other computing units in a same group in parallel;

performing inter-group trust authentication among the plurality of groups in parallel to obtain N trusted computing units on which trust authentication succeeds; and forming a trusted computing cluster by propagating first secret information in the N trusted computing units on which trust authentication succeeds for the N trusted computing units to each obtain the first secret information.

18. The computing device according to claim 17, wherein the inter-unit trust authentication includes:

each computing unit of two computing units performing mutual trust authentication through following actions:

obtaining a unit authentication report of other computing unit of the two computing units from the other computing unit, and sending the unit authentication report of the other computing unit to a third-party authentication institution for authentication; and sending a unit authentication report of the computing unit to the other computing unit for the other computing unit to send the unit authentication report of the computing unit to the third-party authentication institution for authentication.

19. The computing device according to claim 17, wherein the performing the inter-group trust authentication among the plurality of groups in parallel includes:

identifying the plurality of groups with a group sequence of the plurality of groups; and causing the plurality of groups to each perform inter-group trust authentication with a neighboring group in the group sequence of the plurality of groups, in parallel.

20. The computing device according to claim 17, wherein the performing the inter-group trust authentication among the plurality of groups in parallel includes:

causing at least one group in the plurality of groups to simultaneously perform inter-group trust authentication with a maximum of K other groups.

* * * * *